March 26, 1935.    G. A. DE BOER    1,995,883
GAUGE FOR STORAGE BATTERIES
Filed July 29, 1932
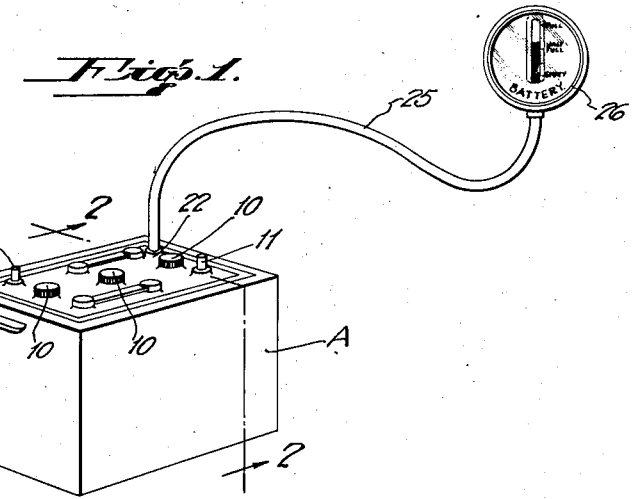
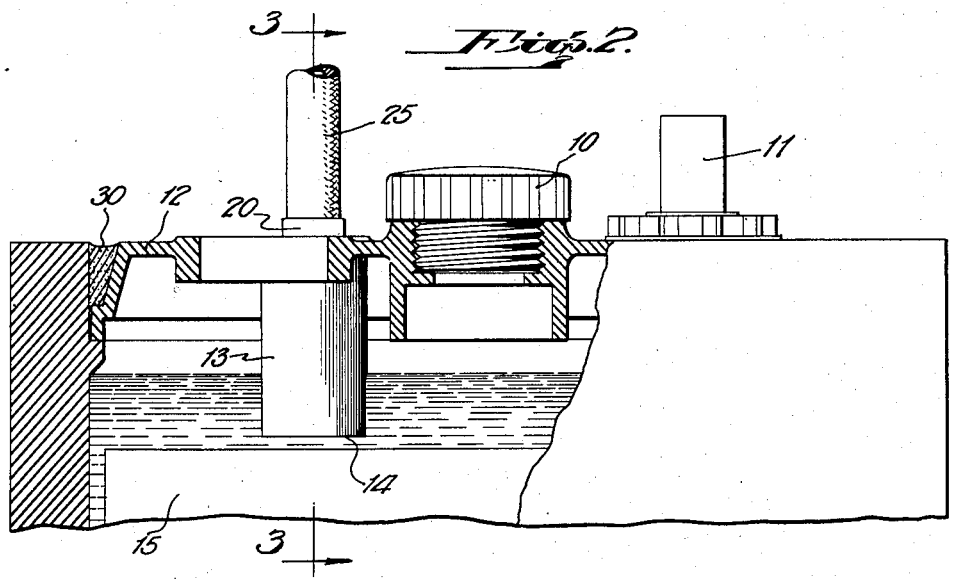
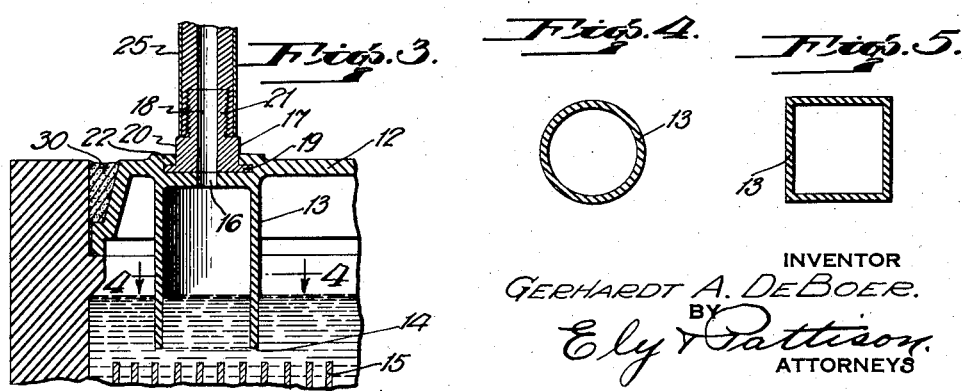
INVENTOR
GERHARDT A. DE BOER.
BY
Ely & Pattison
ATTORNEYS Patented Mar. 26, 1935

1,995,883

UNITED STATES PATENT OFFICE 1,995,883

GAUGE FOR STORAGE BATTERIES

Gerhardt A. De Boer, Brooklyn, N. Y.

Application July 29, 1932, Serial No. 625,853

1 Claim. (Cl. 73—54)

The present invention relates to new and useful improvements in storage batteries and it contemplates a construction which particularly adapts storage batteries for use in connection with a gauge or indicator to indicate the level of the electrolyte in one of the cells of the battery.

An object of the invention is to provide means forming a permanent part of the top or cover plate of a storage battery for the attachment of a liquid level gauge thereto.

A further object of the invention resides in the formation of novel means associated with the top or cover plate and projecting or depending therefrom a sufficient distance that its lower end will be positioned below even a subnormal level of electrolyte in a storage battery cell.

Other objects of the invention will be apparent as the nature of the invention is understood for which purpose reference will be had to the following specification and claim and the accompanying drawing, in which;

Figure 1 is a perspective view of a storage battery constructed in accordance with the present invention, said figure illustrating a gauge of conventional form attached to the battery, Figure 2 is a fragmentary sectional view on an enlarged scale taken on the line 2—2 of Figure 1, Figure 3 is a fragmentary sectional view taken on the line 3—3 of Figure 2, Figure 4 is a horizontal sectional view taken on the line 4—4 of Figure 3, and;

Figure 5 is a horizontal sectional view illustrating a modified form of the invention.

Referring more specifically to the drawing, the reference character A designates a battery of the three cell type having the usual filling opening closing caps 10 and terminals 11 and 12. The terminal 11 in the present illustration is the positive terminal of the battery, the terminal 12 being the negative terminal.

It is well known that the electrolyte in the cell of the positive terminal depreciates in volume with greater rapidity than in the remaining cells and therefore, this cell may be employed as a safe indication of the condition of the electrolyte in the remaining cells. For this reason I prefer to attach the gauge to the positive cell since the indication or reading of the liquid level in the positive cell can, as heretofore stated, be relied upon as a safe indication of the liquid level condition in the remaining cells.

In carrying out the present invention I provide the top or cover plate 12 of the battery with an integral tubular extension 13 so arranged as to depend therefrom. The free or lower end of this tubular extension is open and when the cover plate is in place upon the battery the lower open end 14 of the tubular member 13 occupies a position in close proximity with the edges of the plates 15 of the cell. The opposite end of the tubular extension 13 is formed with a constricted opening 16. Carried by the cover plate 12 there is a fitting or coupling 17 which has passage 18 therethrough. This fitting or coupling 17 is so positioned with respect to the cover plate 12 and the constricted opening 16 that the passage 18 thereof will be in alignment with said constricted opening 16. The fitting or coupling is provided with a flange 19, a main body portion 20 and a reduced exteriorly threaded extension 21. The flange 19 forms means by which the fitting or coupling may be anchored in the cover plate 12 by molding the cover plate about the same as indicated at 22 in Figure 3 of the drawing. The body portion 20 of the fitting projects slightly above the cover plate 12 and the threaded extension 21 thereof forms a means for the attachment of a tube 25, the opposite end of which is connected to a gauge 26 preferably of the manometer tube type.

The cover plate 12 of the battery is secured in position in the ordinary manner as by cementing or the like 30. The cells of the battery are then filled with electrolyte to the proper operating level. This causes or produces pressure in the tubular member 13 and the tube 25 which pressure operates the liquid column in the manometer tube of the gauge 26 in a well known manner. As the level of the electrolyte falls and the pressure is reduced a corresponding reading will be had on the gauge 26 which will indicate the level of electrolyte in the cell.

In Figures 1 to 4 the tubular extension 13 has been illustrated as circular in cross sectional form, but the invention is not limited to such circular construction since the tubular extension may be rectangular in cross sectional form as illustrated in Figure 5, or the same may take other desired cross sectional forms.

I am aware that it is not new to provide storage batteries with gauges of this type and therefore do not claim this idea broadly. I do, however, claim the specific construction of battery cover plate herein illustrated which construction, as has been proven in actual practice, is a practical one for the purpose intended.

Having thus described the invention, what is claimed as new and what it is desired to secure by Letters Patent of the United States, is:

A device of the character described comprising a cover plate, a tubular member having an open inner end, said tubular member being formed integral with the cover plate and extending from the inner face thereof, said cover plate having an opening therein arranged substantially axially of the tubular member, a fitting molded into the cover plate and having a passage therethrough in alinement with the opening in the cover plate, a flange on said fitting, said flange providing means for anchoring said fitting in the cover plate, and a reduced threaded extension on said fitting, said reduced threaded extension providing means for the attachment of a tubular member, as and for the purpose set forth.

GERHARDT A. DE BOER.